No. 781,096. Patented January 31, 1905.

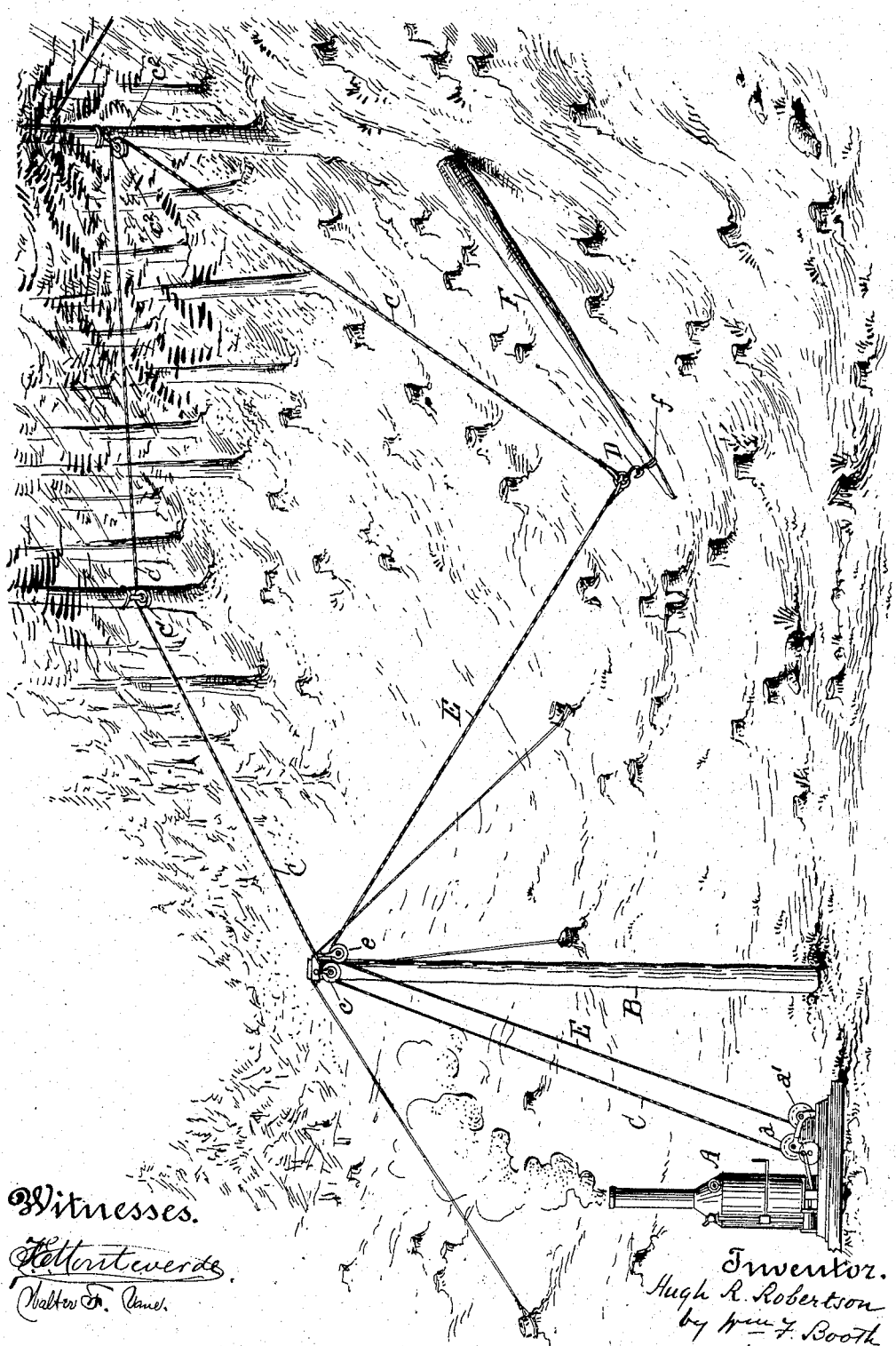

UNITED STATES PATENT OFFICE.

HUGH RODERICK ROBERTSON, OF PORTLAND, OREGON.

LOGGING APPARATUS.

SPECIFICATION forming part of Letters Patent No. 781,096, dated January 31, 1905.

Application filed June 20, 1904. Serial No. 213,238.

*To all whom it may concern:*

Be it known that I, HUGH RODERICK ROBERTSON, a citizen of the Dominion of Canada, residing at Portland, Multnomah county, State of Oregon, have invented certain new and useful Improvements in Logging Apparatus; and I do hereby declare the following to be a full, clear, and exact description of the same.

My invention relates to that class of apparatus for handling and carrying logs from where they lie when cut to a common spot of departure for transportation to their destination.

My invention is especially applicable to and is an improvement upon that class of apparatus employing a traveling line and a trip or haul-back line, which in the usual type extend directly out from their winding-drums to the log. Much difficulty is experienced, especially when working with very large logs or sticks or in an area covered with debris or having many stumps, in hauling the logs thus directly, because of the stumps, the inequalities of the ground, other logs and obstructions of every kind, because the advancing end or point of the log or tree being hauled cannot avoid such obstructions. Especially is this the case where operations are being conducted to haul logs from a hillside and across valleys, for in such case the lay of the land and the direct and low course of the lines render it certain that the advancing end of the log or tree will be low down and will meet every possible obstruction. It is not always practicable from the standpoint of expense and from other considerations to employ an overhead-wire system, and it happens, therefore, that because of the simplicity and economy of the direct-line system it is employed notwithstanding its disadvantages.

It is the object of my invention to provide an apparatus which will embody the simplicity of the direct-line system and remedy its defect without, on the other hand, resorting to the expense of the overhead-wire system.

To this end my invention consists in the combination of parts, which I shall hereinafter fully describe.

Referring to the accompanying drawing, the figure is a perspective view of my logging apparatus *in situ*.

At a suitable point at the base of a hillside I set up and suitably guy a high mast B, and in its vicinity I place the engine A, which has a trip-line drum $a$ and a hauling-line drum $a'$.

C is the trip or haul-back line. It extends from drum $a$ up to and over a block $c$, hung from the masthead, and thence to a guiding-point to carry it well out of the way of the hauling-line—say to a block $c'$, secured to a stump or tree off to one side—and thence said line extends to the terminal or head-block $c^2$, secured high up on a tree on the hillside. From this head-block the trip-line extends back to the butt-hook D of the hauling-line E. The hauling-line extends from the drum $a'$ up to a block $e$ at the masthead and thence down to the butt-hook D.

The log or whole tree F is represented as upon the hillside. With a choker-strap $f$, secured to the small end of the tree, the butt-hook D is connected. Now upon hauling in on the line E and paying out the line C the log or tree will be hauled in; but on account of what I may term the "high-line" pull, due to the mast B, the point of the log or tree instead of being, as usual, depressed is lifted and is thus enabled to clear all obstructions. It will thus travel without any difficulty, its advancing end clearing every obstruction, no matter of what character, and its butt-end dragging on the ground and riding over obstructions. By simply changing the head-block $c^2$ the apparatus may be swung around to work throughout the whole circle, if necessary.

Having thus described my invention, what I claim as new, and desire to secure by Letters Patent, is—

1. A logging apparatus comprising a mast, a hauling-line guided by the masthead and thence extending unguided to the log, said line having a log-engaging means on its extremity, a separate trip or haul-back line suitably guided and having its extremity secured to the log-engaging means of the hauling-line and separate winding-drums for operating said lines.

2. A logging apparatus comprising a mast, a hauling-line guided by the masthead and thence extending unguided to the log, said line having a log-engaging means on its extremity, a separate trip or haul-back line, also guided by the masthead and having its extremity secured to the log-engaging means of the hauling-line, and separate winding-drums for operating said lines.

In witness whereof I have hereunto set my hand.

HUGH RODERICK ROBERTSON.

Witnesses:
 WALTER F. VANE,
 D. B. RICHARDS.